United States Patent [19]

Shimizu et al.

[11] Patent Number: 4,602,867

[45] Date of Patent: Jul. 29, 1986

[54] COPYING APPARATUS

[75] Inventors: Katsuichi Shimizu, Hoya; Shunichi Masuda, Tokyo; Toshiaki Yagasaki, Hino, all of Japan

[73] Assignee: Canon Kabushiki Kaisha, Tokyo, Japan

[21] Appl. No.: 776,638

[22] Filed: Sep. 16, 1985

Related U.S. Application Data

[63] Continuation of Ser. No. 461,240, Jan. 26, 1983, abandoned, which is a continuation of Ser. No. 201,480, Oct. 28, 1980, abandoned.

[30] Foreign Application Priority Data

Oct. 30, 1979 [JP] Japan ............................... 54-140784

Apr. 4, 1980 [JP] Japan ............................... 55-44965

[51] Int. Cl.[4] ............................................ G03B 27/52

[52] U.S. Cl. ................................ 355/55; 355/14 C; 355/60; 355/14 SH

[58] Field of Search .................... 355/14 R, 14 C, 55, 355/60, 14 SH

[56] References Cited

U.S. PATENT DOCUMENTS 4,099,860 7/1978 Connin ............................ 355/14 C 4,162,848 7/1979 Platt ................................ 355/14 C 4,222,660 9/1980 Furuichi et al. ..................... 355/55

*Primary Examiner*—Monroe H. Hayes

*Attorney, Agent, or Firm*—Fitzpatrick, Cella, Harper & Scinto

[57] ABSTRACT

There is disclosed a copying apparatus which enables obtainment of copy images different in size from original document images. Particularly, there is disclosed an improved variable magnification copying apparatus having multiple sheet feeding portions.

14 Claims, 24 Drawing Figures

| | $S_1$ | $S_2$ |
|---|---|---|
| B4 | ON | ON |
| A4 | ON | OFF |
| B5 | OFF | ON |
| NO SHEET | OFF | OFF |
FIG. 3-2
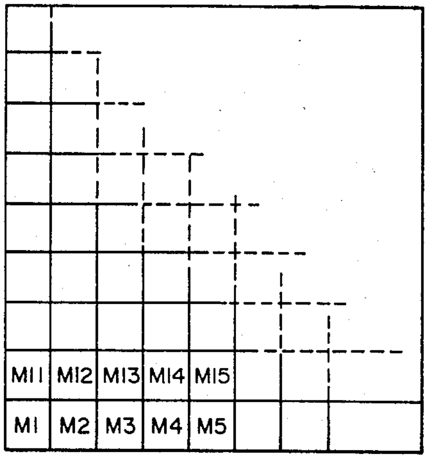
FIG. 3-3
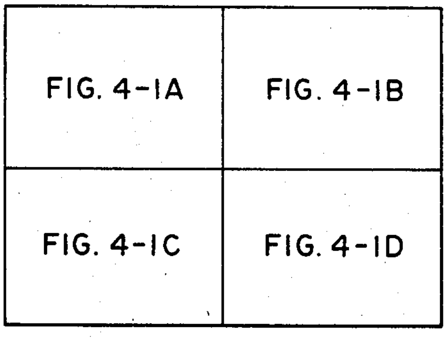
FIG. 4-1
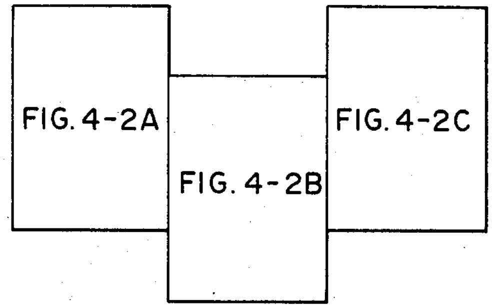
FIG. 4-2
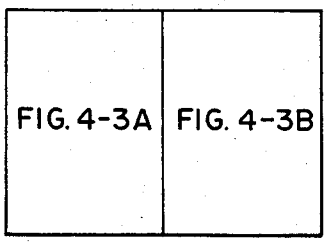
FIG. 4-3
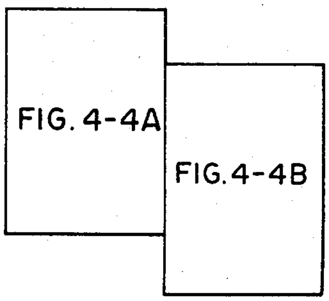
FIG. 4-4

COPYING APPARATUS

This is a continuation of application Ser. No. 461,240 filed Jan. 26, 1983, which in turn is a continuation of Ser. No. 201,480, filed Oct. 28, 1980, both abandoned.

BACKGROUND OF THE INVENTION

1. Field of the Invention

This invention relates to a copying apparatus which enables obtainment of copy images different in size from original document images.

2. Description of the Prior Art

Copying apparatus are known in which document images are reduced in size and copied on transfer paper. There are also copying apparatus which are provided with a plurality of transfer paper feeding portions and in which reduction copying is effected by selecting a desired one of the paper feeding portions. In this case, in order that copying may be effected on sheets of a proper size in accordance with the reduction rate, design has been made such that copying is not effected on sheets of the other sizes than that size. Accordingly, an inconvenience has been encountered when it is desired to take a reduced copy on a portion of a large-size sheet. In contrast, if the selection of the paper feeding portions is made entirely free, the relation between the reduced copy and the selected sheet will become entirely unpredictable and this is also inconvenient.

Further, when, during continuous magnification change copying, it is desired to produce a plurality of copies at a different magnification in a haste, it has heretofore been the practice to once interrupt the continuous copying and set the magnification for the hurried copying, and thereafter carry out copying. Therefore, in order that the continuous copying may be resumed, it has been necessary to again set the magnification of the initial copying and set a desired number of copies. Thus, the resumption of copying after the hurried magnification change copying has been very cumbersome.

Also, it is sometimes the case that even if the first copying has been resumed by setting the magnification and setting the number of copies after the hurried magnification change copying, the sheets of the size available for the first copying become entirely exhausted with the cassette having been interchanged for the hurried magnification change copying and the first copying is continued on sheets of a different size.

SUMMARY OF THE INVENTION

It is an object of the present invention to provide a copying apparatus capable of magnification change which eliminates the above-noted disadvantages.

It is another object of the present invention to provide an improved variable magnification copying apparatus having multiple sheet feeding portions.

It is still another object of the present invention to provide a copying apparatus which, in spite of having taken a copy or copies at a different magnification in a hurry during the interruption of the first magnification change copying, resumes the copying at the initial magnification and by the initial set number without entering the magnification of the first copying thereafter.

It is yet still another object of the present invention to provide a copying apparatus which, after termination of hurried preferential copying, can resume the initial copying by changing the mode into a mode of a magnification different from the magnification for the initial copying.

It is a further object of the present invention to provide a copying apparatus in which, when sheets of a predetermined size become exhausted during magnification change copying and during hurried preferential copying or after the preferential copying, sheets of the predetermined size are automatically fed from another paper feeding portion to continue the copying.

It is a further object of the present invention to provide a copying apparatus which, when the input for hurried magnification change copying is entered, can be automatically set to the standard mode to effect copying and, after termination of the hurried copying, can automatically restore the initial copying magnification data to set the lens to the initial magnification mode.

The invention will become fully apparent from the following detailed description thereof taken in conjunction with the accompanying drawings.

BRIEF DESCRIPTION OF THE DRAWINGS

FIGS. 3–1 shows a combination relation of FIGS. 3–1A and 3–1B.

FIGS. 3–1A and 3–1B in their combination show a diagram of the copying control circuit in the copying apparatus of FIG. 1.

FIGS. 3–2 is a diagram showing size determination.

FIGS. 3–3 is a memory map.

FIGS. 4–1 shows a combination relation of FIGS. 4–1A to 4–1D.

FIGS. 4–2 shows a combination relation of FIGS. 4–2A to 4–2C.

FIGS. 4–3 shows a combination relation of FIGS. 4–3A and 4–3B.

FIGS. 4—4 shows a combination relation of FIGS. 4–4A and 4–4B.

FIGS. 4–1A∼4–1D, 4–2A∼4–2C to 4–3A∼4–3B show in their combination a control flow chart by the control circuit of FIG. 3.

FIGS. 4–4A∼4–4B, 5–1 and 5–2 show further control flow charts.

DESCRIPTION OF THE PREFERRED EMBODIMENTS

Figure 1:
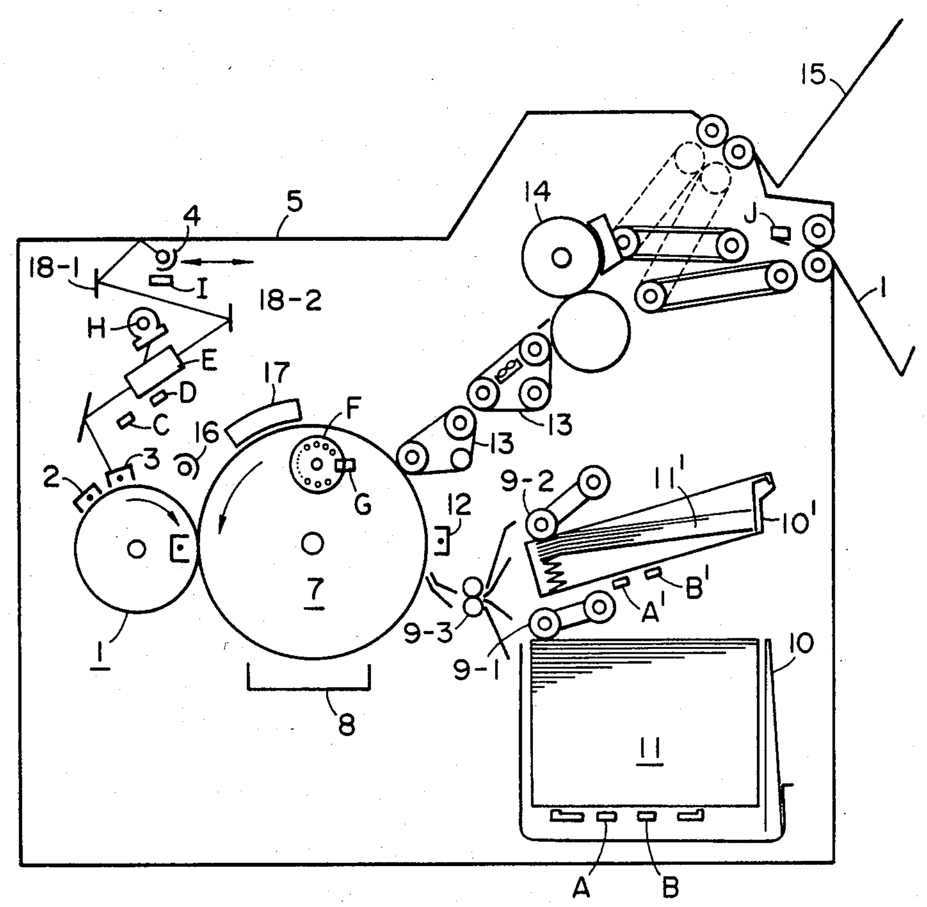
FIG. 1 is a cross-sectional view of a copying apparatus to which the present invention is applicable.

Referring to FIG. 1, it is a schematic cross-sectional view of an example of the copying apparatus to which the present invention is applicable. It includes a photosensitive screen 1, a primary charger 2, a secondary charger 3, a lamp 4, an original carriage 5, a modulation charger 6, an insulating drum 7, a developing device 8, a roller 9 for feeding transfer paper 11, an image transfer charger 12, a conveyor belt 13, a fixing roller 14 and a tray 15.

An original on the original carriage 5 is slit-exposed while the lamp 4 and a mirror 18-1 are moved forward and a mirror 18-2 is moved forward at one-half of the velocity of the mirror 18-2, and the image of the original is projected upon the so-called three-layer screen 1 pre-charged by the primary charger 2 and rotating, simultaneously with the corona discharge by the secondary charger 3, thereby forming an electrostatic latent image on the screen 1. After the formation of the primary latent image, the screen 1 and the insulating drum 7 are rotated at a double velocity and from the primary latent image, a secondary electrostatic latent image is formed on the insulating drum 7 by the modulation charger 6, whereafter the secondary latent image is developed by the developing device 8. The toner image is transferred to the transfer paper 11 by the charger 12, the transfer paper being fed from a main cassette 10 by the paper feed roller 9 which is operated at a predetermined timing. The transfer paper 11 is conveyed by the belt 13 and the toner image thereon is fixed by the fixing device 14, whereafter the transfer paper 11 is discharged into the tray 15. Still after the formation of the secondary latent image, the primary latent image remains unerased and therefore, the screen 1 is further rotated so that a secondary latent image is again formed on the drum 7 by the charger 6, and the secondary latent image is developed and transferred. Sheets of transfer paper are successively supplied to the image transfer station and image transfer, fixation and discharge are continued. Register rollers 9-3 are for well accomplishing the image transfer registration.

Designated by 16 is a lamp for discharging the screen, and 17 is a cleaning station for removing the toner on the insulating drum 7.

A and B designate paper size detectors in an upper container portion UP (11), and A' and B' denote paper size detectors in a lower container portion LW (11'). Designated by 11 is a cassette which is removable with respect to the apparatus body. Denoted by 11' is a fixed deck. F designates a disc rotatable in synchronism with the drum 7 to optically detect the rotational position of the drum, and G denotes a detector therefor provided by a photointerrupter. The detector G generates clock pulses of a period of about 1 m sec. E designates a lens unit provided in the optical image path of the document, C denotes a detector for detecting the set position of the lens during reduction, and D designates a detector for detecting the set position of the lens during equal magnification. H denotes a lens moving reversible motor for changing the position of said lens. I designates a home position detector for detecting the stop position of the first mirror before copying is started. J denotes a switch for detecting the discharge of paper to detect jam.

The pulse from the above-described pulse generator is used to control the timing of each process operation.

Figure 2:
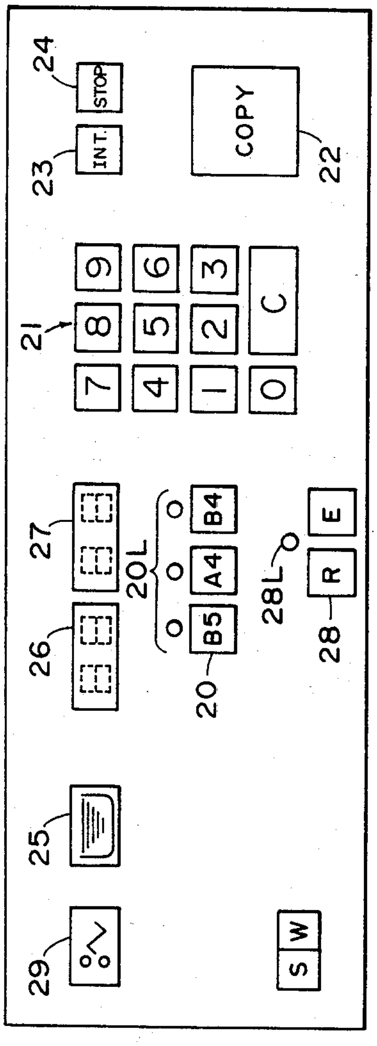
FIG. 2 is a plan view of the operating unit of the copying apparatus shown in FIG. 1.

Reduction copying produces copies 0.7 times as large as a document image. For this purpose, the reduction switch of FIG. 2 is actuated. Thereby, the motor H is operated at a predetermined timing after the start of copying and the lens unit E is set to a position D. Then, the scanning movement velocities of the mirrors and lamp are made faster than those for equal magnification.

FIG. 2 shows the operating unit of the copying apparatus of FIG. 1. It includes paper size selecting keys 20, a pilot lamp 20L for indicating the selected size, a ten-key block 21 for setting the number of sheets to be set, an indicator 26 for indicating the number of sheets set by the keys 21, an indicator 27 for indicating the number of copies, and a lamp 25 adapted to be turned on for a selected paper size button 20 when no paper is contained in any of the paper container portions UP and LW. Designated by 22 is a key for starting the copying operation. Denoted by 23 is an interrupt key which may be depressed irrespective of the stand-by or the copying. When this key is depressed during the copying, the copying is stopped in the interruption mode. Immediately after the copying has been stopped, the contents of the indicators 26 and 27 and the size selected by a size key 20 are retracted into a predetermined address of a memory, and the indicator 26 indicates "1" and the indicator 27 indicates "0". Thus, a different document can be copied quickly. It is accomplished by an operator who has acted hastily in setting a new-number of sheets in the indicator 26 by a key 21, actuating another size key 20 to change the size, and actuating a copy key 22. Immediately after a second copy has been produced, the contents for completing a first copy before the second copy are recalled from the memory into the indicators 26 and 27. Designated by 24 is a stop key used when it is desired to cancel the copy set by the indicator 26 during the copying operation or during the interruption of the operation or when it is desired to cancel only a hurried second copy (repeated a plurality of times). Denoted by 28 is an equal magnification/reduction magnification change-over switch, and 28L is a lamp adapted to be turned on during reduction. Reference numeral 29 designates a lamp for warning of the jammed condition of transfer paper 11.

Figures 1, 3:
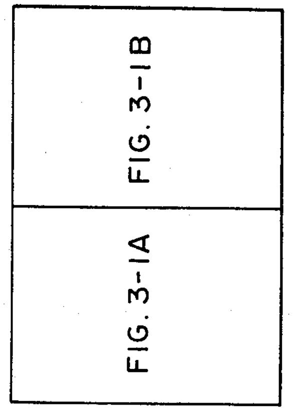
Figures 1A, 3:
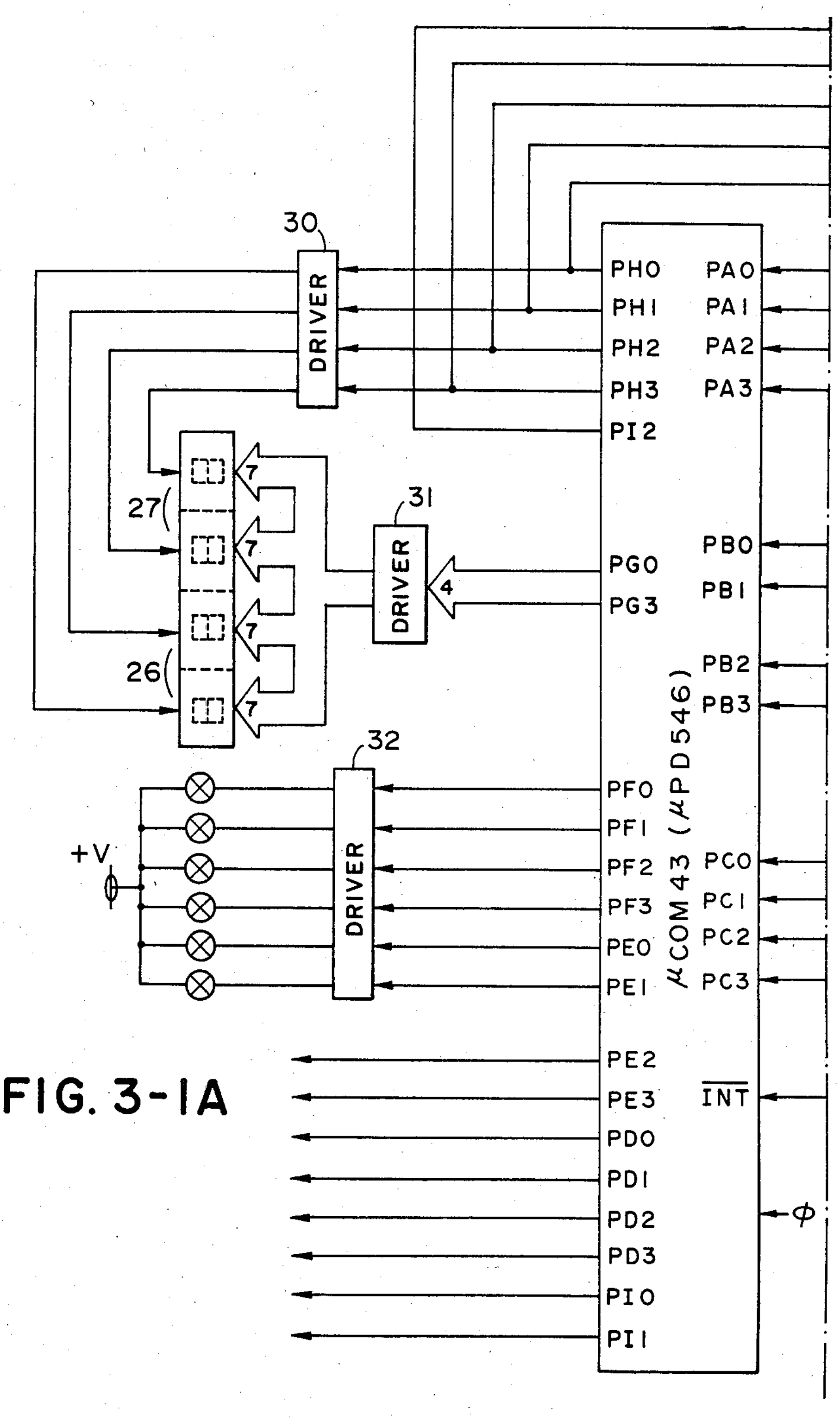
Figures 1B, 3:
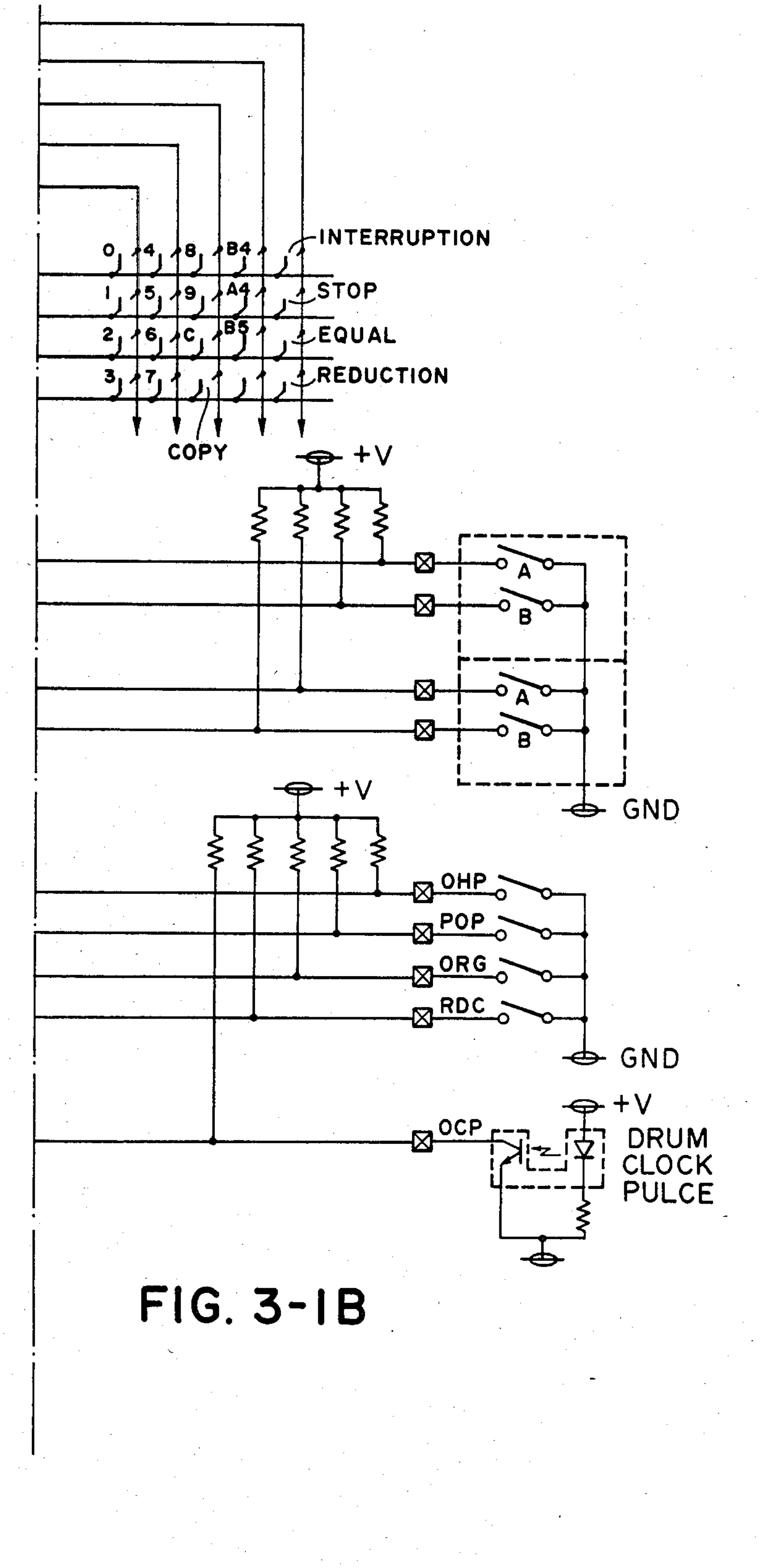

FIGS. 3-1A and 3-1B show in their combination an example of the control circuit (hardware construction) in the present invention. This example is a circuit construction using the computer μCOM43 (μPD546) of Nippon Denki Co., Ltd. The key matrix entered into the PA port has the keys 20, 28, 21, 23, 24 and 22 of FIG. 2 connected to the intersection thereof. Switches connected to PBO and PBI correspond in input to the size detectors A and B of FIG. 1, switches connected to PB2 and PB3 show the size detectors A' and B' of FIG. 1, PCO shows the mirror home position detector I of FIG. 1, PC1 shows the sheet detector J, PC2 and PC3 show the lens position detectors D and C, and INT corresponds in input to the drum pulse generator G.

The codes of the paper size detectors A and B (A' and B') are shown in FIGS. 3-2. That is, switches $S_1$ and $S_2$ respectively corresponding to A and B show $B_4$ size when both of these switches are closed, show the absence of paper when both switches are open, show A4 size when $S_1$ is closed and $S_2$ is open, and show 135 size when $S_1$ is open and $S_2$ is closed. these switches are disposed so as to directly detect paper. Where cassettes of different sizes are used, a cam may be provided on each of the cassettes and a cam switch may be provided on the apparatus body to effect the above-described determination.

Output ports PH0-PH3 are connected to numerical value indicators 26 and 27 thorugh a driver amplifier 30 and put out repeat signals for selecting the digits of the respective indicators. Also, these output ports and port PI2 are connected to the aforementioned input matrix. These output ports control the key entry of input ports PA0-PA3. They put out time-divided strobe signals for the so-called dynamic control to the indicators and keys.

Ports PG0-PG3 put out 4-bit code signals to select the segments of the LEDs of the numerical indicators 26, 27 and cause them to emit light. These signals are converted into 7-bit code signals by a decoder driver 31.

PF0-PE1 are signals for turning on the size lamp 20, no-sheet lamp 25, jam lamp 29 and reductinlamp 28 and are put outto the respective lamps through a driver amplifier 32.

PE2-PI1 put out latch signals for sequence-controlling the process load for the copying operation. PE2 puts out the ON signal of a motor for rotating the drums 1, 7, PE3 puts out a signal for turning on the exposure lamp 4, PD0 puts out the ON signal of the high voltage transformers of the corona chargers 2, 6, 12, PD1 puts out the ON signal of the solenoid for rotating the register rollers 19, PD2 puts out a signal for selecting the cassette 11' when the output is 1 and for selecting the deck 11 when the output is 0, and PD3 puts out a signal for operating the paper feed rollers 9-1 and 9-2. That is, when PD2 is 1 and PD3 is 1, the paper feed roller 9-2 is operated to feed a sheet of paper from the cassette. PI0 and PI1 put out signals for operating the reversible motor so that the lens is set to the reduction mode position and the equal magnification mode position, respectively.

Figures 1A, 4:
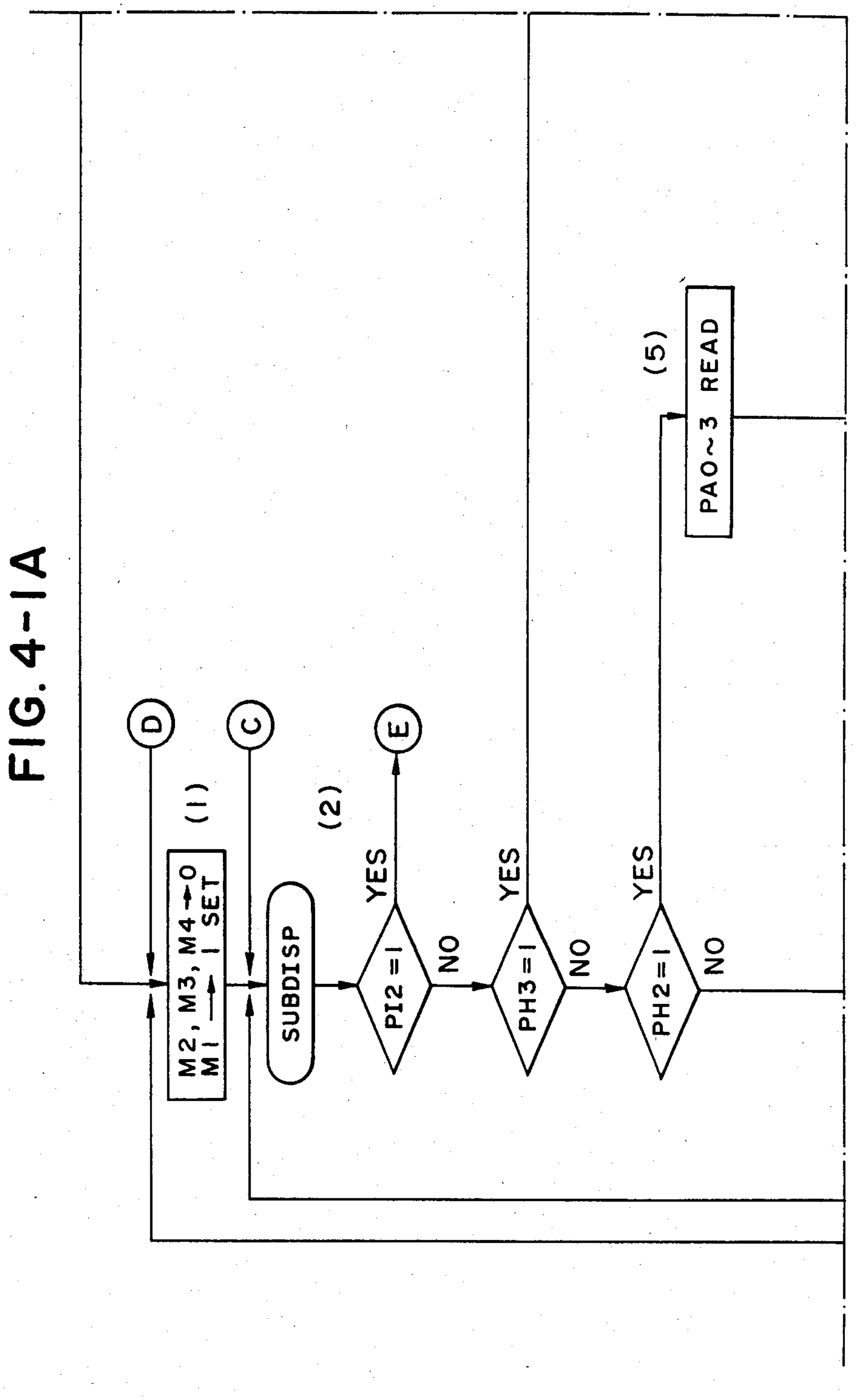
Figures 1B, 4:
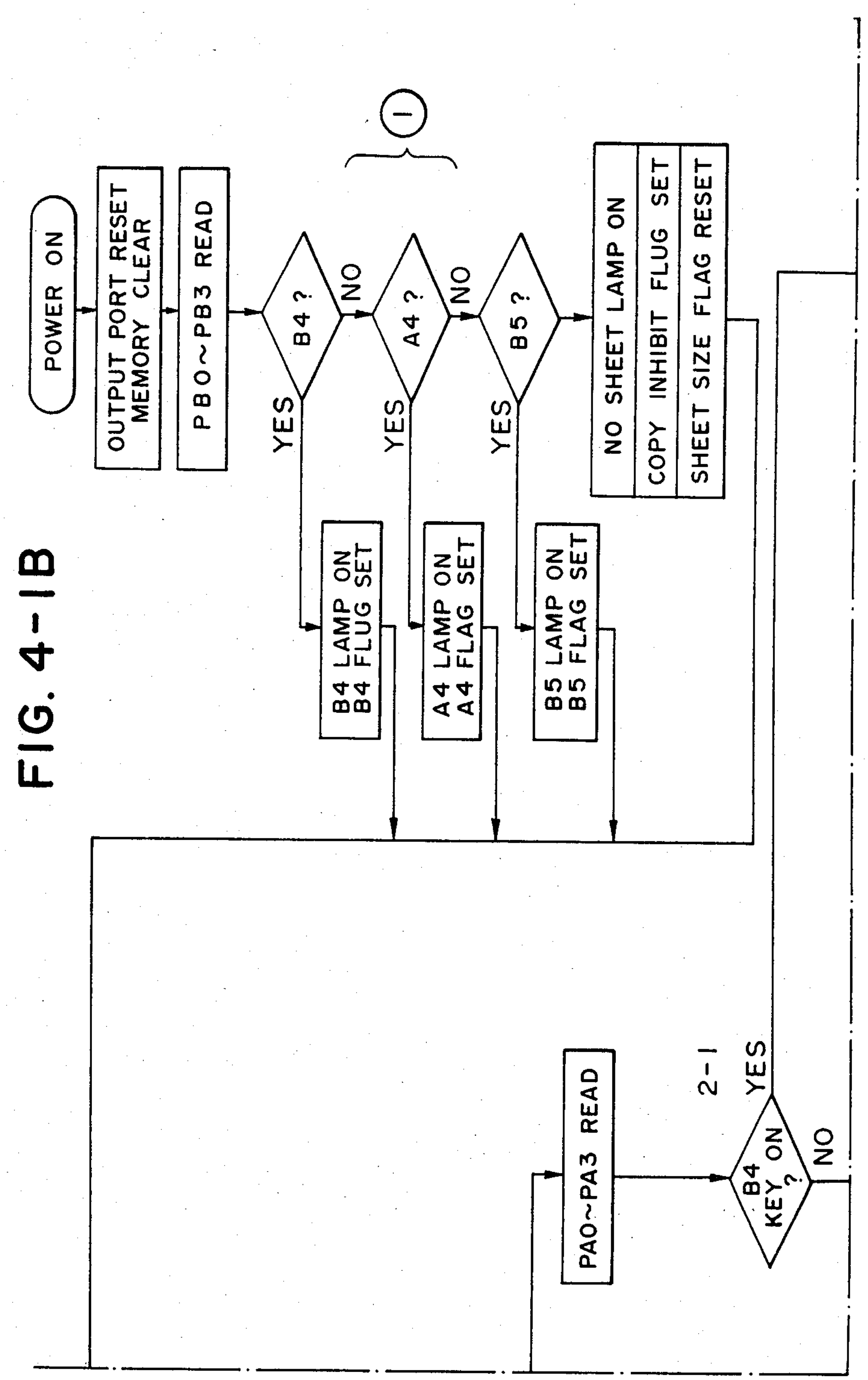
Figures 1C, 4:
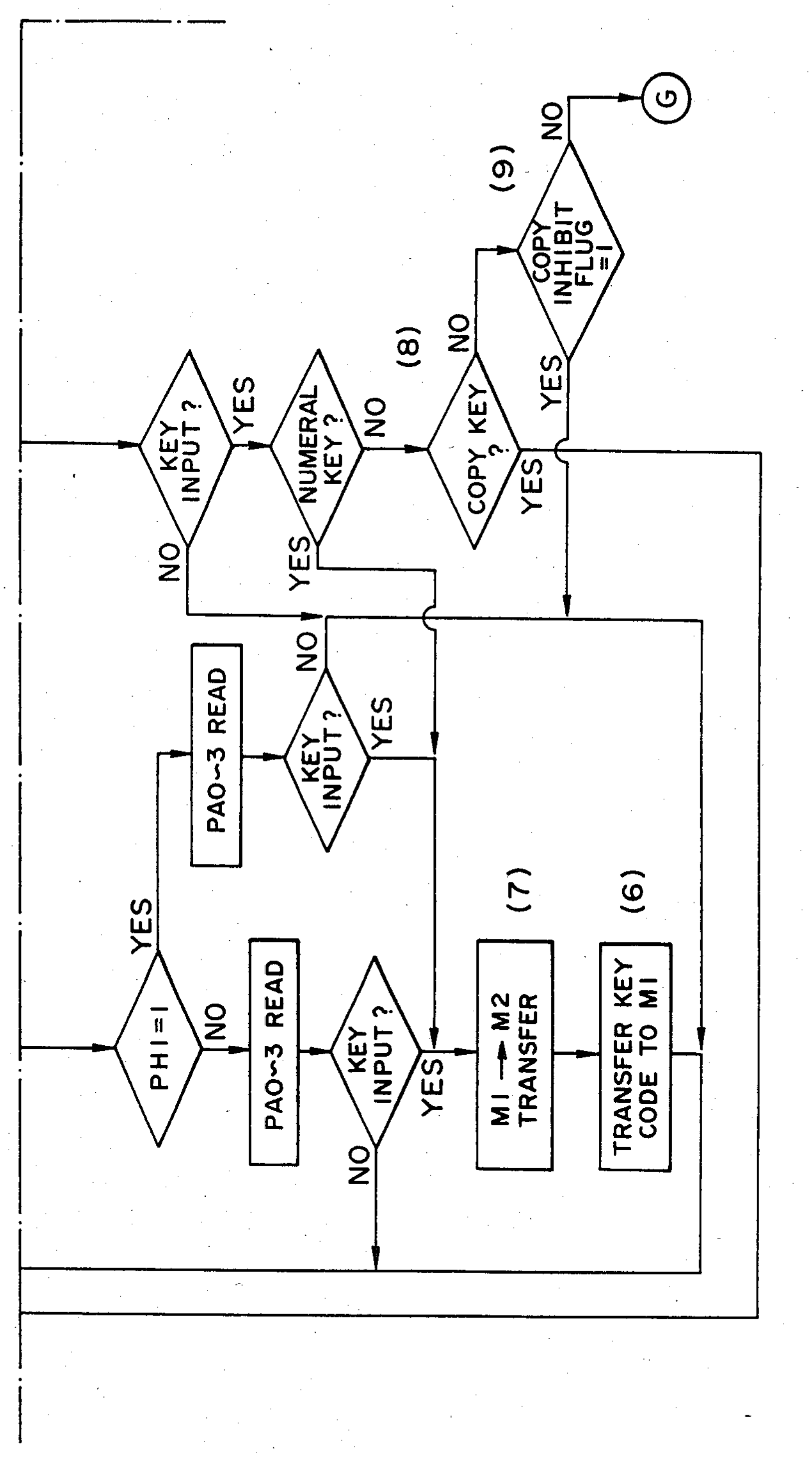

FIGS. 4-1A∼4-1D, 4-2A∼4-2C, 4-3A∼4-3B show in their combination a control flow chart in which the circuit of FIGS. 3-1A∼3-1B and each process means of FIG. 1 are operated. Instruction routine codes in accordance with this flow chart are stored in the program memory ROM of the mocrocomputer μCOM of FIGS. 3-1A and 3-1B.

The blocks ①-⑩ in this flow chart are concerned with the present invention.

Block ① is a routine in which, when the main switch has been closed, whether or not the size of the paper contained in the paper container portion is B4, and then judgment of A4 or B5 is effected and the presence of paper is searched. At a point of time whereat the size of the paper has been confirmed, each size lamp is turned on. Simultaneously therewith, the size is stored as a flag data in RAM. Further, when there is no paper, the no-sheet lamp is turned and the machine is set so as to inhibit copying.

Block ② is a flow chart in which the actuation of the paper size selecting key is detected. When that key has been detected, whether or not paper of the size corresponding to the key is contained in the upper or lower container portion and, when there is such paper, the lamp for the corresponding size is turned on and a signal for selecting the container portion UP or LW in which the paper of that size is contained is put out. When there is no cassette or paper corresponding to the selecting key, the no-sheet lamp is turned on.

Block ③ is a flow chart in which, after the copy key has been depressed and before the copying operation is started, the lens is moved by the reversible motor in accordance with the equal magnification/reduction and set to a desired magnification position. Until before the copy key is depressed, the lens is not moved even if the reduction switch has been closed. Consequently, the lens is not moved indiscriminately.

Block ⑤ is a flow chart in which the interrupt key is detected during stand-by. When it has been detected, whether or not the interrupt key has ever been depressed is discriminated and when it has not been depressed in the past, the data such as the number of sheets already set, the number of copies during rthe interruption of copying, the paper size already set and the equal magnification/reduction already set are retracted into other memory (register) of the RAM.

Block ⑥ is a routine in which detection of the stop key is effected. The stop key forcibly recalls from the memory the data once retracted by the interrupt key during stand-by. When the stop key has been detected, whether or not the interrupt key has ever been entered is judged and, when the interrupt key has ever been depressed, each data retracted into said other memory by the routine ⑤ is recalled.

Blocks ⑨ and ⑩ are flow charts in which numerical value display is effected during the execution of the copying operation and the interrupt key or the stop key is detected to shift the cycle to the post rotation mode. When the interrupt key has been detected, whether or not the same key has ever been depressed is detected and when it has never been depressed, an interrupt inhibiting flag and a copy inhibiting flag for storing the effect that that key was depressed during the copying are set. When the stop key has been detected, a copy inhibiting flag is set. During each copy cycle, this copy inhibiting flag is judged and, when it is set, the cycle is shifted to the termination mode (post rotation mode).

Block ④ is a flow chart in which whether the interrupt key has been depressed to stop the copying or the interrupt copy cycle has been cancelled by the stop key is judged at the point of time whereat the copying has been stopped (interrupted) under the above-described conditions and, in the former case, the number of copies, the number of set sheets, the paper size and equal magnification/reduction are retracted into other memory area of the RAM and, in the latter case, the contents of said other memory area are recalled into the original memory area.

Blocks ⑦ and ⑧ are flow charts for judging whether or not the equal magnification key and the reduction key have been depressed. Control of the equal magnification and the reduction display lamp is effected to contribute to the execution of said routine ③.

The control flow chart of the key entry, display, sequence, memory retraction and memory recall of FIG. 4 is stored in the memory ROM in the microcomputer μCOM43 of FIG. 3-1. Also, the copy preset number, the number related to the number of remaining copies, the size, the magnification change data, the retracted numbers thereof, the data, the flag necessary for the execution of the flow, etc. are stored in predetermined areas of the memory RAM. That is, said respective data are stored in the areas (addresses) M1-Mn of the memory RAM of FIGS. 3—3. Also, the flow of the ROM is read out and decoded by a processor CPU in μCOM43 in response to a microclock pulse $\phi$ or the number, data and flag in the RAM are read out to effect the input control, the output control and the memory control.

Operation will now be described. By the closing of a main switch SW (FIG. 2), the output port, RAM and other registers of the μCOM43 of FIGS. 3-1 are cleared (reset). Accordingly, the port PD2 is 0 and therefore, the deck 11 is given preference as the feeding portion. Then, input ports PB0-PB3 are sensed, routine ① is executed, and the condition of the size detecting switch is determined. Then, the data of the sizes of the paper contained in the cassette and deck are stored into M5-M7 of the RAM (in the order of B4, A4 and B5 flags). If B4 is contained in the cassette and A4 is contained in the deck, B4 is displayed and the B4 flag is set. Next, in step 1, memory areas M1, M3 and M4 for storing numbers are rendered to 0 and 1 is set in M2. That is, the preset number is initially set to 1 and the copy number is initially set to 0. In step 2, that memory number is put out to the indicators 26 and 27 through PG0-PG3. Subsequently, the flags set in accordance with the time-divided signal outputs from output ports PI2, PH3, PH2 and PH1 are sensed, and the routines ⑤-⑧ for the key entry of the interrupt key, magnification changing key, etc. and the size key routine ② are executed, whereafter the step proceeds to step 5 for the entry of the numeric key and copy key.

Where the desired size key is B4, whether the container portion containing B4 sheets therein is the cassette or the deck is discriminated by routine ② and in the case of the cassette, 1 is put out from the output port PD2 to designate the cassette. It is accomplished by determining the type of the flag set in routine ① (2-2) after the actuation of the B4 key has been sensed in step 2-1, and in the case of the B4 flag set, determining which of the cassette or the deck contains the B4 sheets (3-2).

In the case of the A4 key, display is changed over from B4 to A4 and 0 is put out from PD2 to designate the deck. Where the key is B5, there is no corresponding cassette and therefore, the no-sheet lamp is turned on, the B4 size lamp is turned off, the paper size flag is reset and the copy inhibiting flag is set to prevent the start by the copy key (step 4). In this case, the determination of A4 or B5 cassette (2-4, 2-7) is accomplished by sensing input ports PB0–PB3 and determining the combination of the signals thereof.

In step 5 and subsequent steps, whether or not the numeric key has been depressed is judged. By the first depression of the numeric key, the number thereof is set in the first digit area M1 (step 6), and is displayed (step 2). By the second depression of the numeric key, the first digit is transferred to the second digit area M2, and the number of the key depressed at the second time is set in M1 (step 7). Where the clear key has been depressed (step 8), 1 is set in M1 and the other is reset (step 1). Where the copy key has been depressed, the copy inhibiting flag is sensed (step 9) and, if copying is possible, the step proceeds to the magnification change set routine ③.

Routines ⑤–⑧ are ones for judging the other keys and in these routines, each predetermined flag is set by the equal magnification key and the magnification change key.

In the magnification change set routine ③, the inputs of input ports PC0–PC3 are sensed for the first time (step 10), and the condition of the flag set in the key entry routines ⑦ and ⑧ is determined (step 11) and, in the case of the reduction, whether or not the lens is at the equal magnification position, namely, whether or not 1 is set in the port PC2, is judged (11-2), and if so, the reversible motor is operated until the lens is set to the reduction position. When the input port PC2 becomes 1, the motor is stopped (11-3). When the signal of the input port PC2 is reset, the copy sequence is entered. When the equal magnification flag is set, the sensing and judgment of the input port PC3 is executed in step 12 and whether or not the lens is at the reduction position is determined, whereafter the step proceeds to the copy sequence in the same manner as that described above.

In this manner, the reduction key and the selection of sheet size are not related to each other. This is because the allowance of copying operation has been widened so that copies reduced from B4 to A4 can be obtained on sheets of B4 size. This also holds true in the preferential second copying and thereby, even if the reduction during the second copying is effected, copies can be produced on sheets of the same size as that during the equal magnification of the first copying.

When the copy sequence has been entered, the main motor for rotating the insulating drum 7 and the high voltage transformer for operating the chargers and discharger are energized and further, the exposure scanning is started at a predetermined timing to execute the cycle (13-1). When the interrupt key 23 or the stop key 24 is depressed during the copy cycle, the input signal by the key 23 or 24 is discriminated in the routine ⑨ wherein the detecting operation of the mirror home position detector I (step 13-2) takes place after completion of the scanning or in the routine ⑩ wherein the pulse detecting operation of the photo-interrupter G for the control of the process timing takes place. In the case where the interrupt key has been depressed, the interrupt inhibiting flag and the copy inhibiting flag are set as long as there is no flag set by the interrupt key. Where the stop key 24 has been depressed, only the copy inhibiting flag is set. Steps 13-2 and 14 are for judging whether or not 1 is set in the input ports PCO and INT of μCOM43. Step 14 is also for counting the predetermined pulse number for timing control preset in memory area M5. In this step, −1 is effected from M5 each time the pulse is detected and, when M5 has become 0, the modulation charger 6 is energized. Although not shown, the routine ⑩ and step 14 are inserted into the step for effecting the drum pulse count and timing control even in the primary image forming process before step 13-2.

Next, when a copy is completed through the secondary image formation and transfer sequence, whether or not the copy inhibiting flag is set is judged in step 15. If the copy inhibiting flag remains reset, the secondary image formation from the initial step B is again repeated.

However, when the inhibiting flag has been set by the stop key or the interrupt key and when the number of copies set in the memories M1 and M2 has been completed, namely, when the number in M3, M4 has become equal to the number in M1, M2, the post rotation (run out) cycle is entered. That is, after completion of the image transfer of the last copy, the insulating drum 7 and the screen drum 1 are rotated for a predetermined time (several full rotations) to clear the remaining toner image and the remaining charge image. Then, the main motor and the high voltage transformer are deenergized. Copy count is effected by incrementing memories M3 and M4 each time a sheet is fed. Design can be made such that the operation of repeating the secondary image formation from the same primary image by the copy inhibiting flag is not interrupted. In this case, the initial step B means that when the repetition of the secondary image formation is executed by a preset number, the original scanning automatically takes place to effect the reproduction of the primary image. After the reproduction of the primary image, the secondary image formation is again repeated to produce a desired number of copies. That is, by making such a design that the determination of the inhibiting flag is executed before the reproduction of the primary image is started, the preferential copying can be effected during the interruption of the continuous repetitive formation of secondary image. The interrupt key 23 and the stop key 24, unlike the other keys, may be depressed for input at any time on the sequence.

When the interrupt key 23 is depressed in the above-described manner, it is confirmed that it is the first interruption and that it is not the interrupt inhibition, and the interrupt flag is set and the set data and copy data in the memory areas M1-4 and the size data and magnification change data in the other areas are retracted into memory areas M11-14 and others (step 16). Then, the step proceeds to the key entry initial routine of D, in which display is effected with the set data rendered to 1 and the copy data rendered to 0, thus providing the stand-by for storage of another data.

In the case of the interruption by the stop key, namely, where the set number of copies has been completed, the step proceeds from step 15-5 to the key entry routine with the data and display remaining unchanged, thereby providing the stand-by for storage of new data. Alternatively, the remaining copying is continued by the copy key.

Another data is not entered after the interruption by the interrupt key. Or even after the data has been entered, the stop key is depressed before the start of copying, whereupon the previously retracted data are returned to memory areas M1-4 and predetermined areas by the execution of routine ⑥ and step 17 (recall). Thus, the same condition as that when the copying has been interrupted by the stop key is brought about. With the clear key depressed after the entry of data for interruption, the retracted data remains unchanged and new data is cancelled, thus providing stand-by with the standard mode set number being 1 and the feeding portion being the deck. With the clear key depressed after the depression of the above-mentioned stop key, all data are cancelled to provide standby in the standard mode.

After the interruption by the interruption by the interrupt key, other data such as the number of copies, the size and the magnification change are all entered into the memory and the preferential interrupt copying is executed and comleted and routine ④ is reached, whereupon the step proceeds to step 17, in which the data so far are automatically cancelled and the retracted data are recalled and displayed (step 2). This cancellation and recall is effected only after the main motor and the high voltage transformer have been deenergized.

Incidentally, if the desired magnification and the feeding portion differ from those so far used when a desired key 23 for the preferential copying has been depressed, the previously described key entry step and lens set routine are executed to select a desired paper feeding portion and mirror position. If there is no corresponding size, the no-sheet lamp 25 and the size lamp 20L are turned off to inhibit the copying. After the depression of the interrupt key 23, the mode key is not depressed but the copy key is depressed, whereupon a sheet of copy is produced in the standard mode.

When the remaining data of the first copying has been recalled after completion of the preferential copying, if the size data and magnification change data thereof are the same as those of the preferential second copying, the remaining copying is completed by the copy key 22 without the control operation for the restoration of the mode.

However, where the magnification change data differ from each other, when the copy key 22 has been again depressed to resume the first copying, the mirror position is automatically set to the position for the first copying by routine ③, whereby, the remaining copying is effected. That is, in the step 11 of routine ③, the reduction flag of the memory is determined and the lens motor is operatively controlled by the determination data and the lens position detector as already described and is reset to the reduction or equal magnification position. Accordingly, after completion of the second copying, the remaining number of the first copying can be automatically resumed without the key operation for recalling the data from the memory and without the operation of the reduction and equal magnification key 28. However, after the second copying given preference has been terminated and before the copy key 22 is depressed, the key entry routine is not inhibited and therefore, in the meantime, the reduction and equal magnification key 28 can be directly depressed to resume copying in a mode different from the magnification of the first copying. That is, after termination of the second copying, change of the magnification of the first copying becomes possible without cancelling the set number and the copy number recalled into the memories M1–M4. Also, the change becomes possible without cancelling the size flag.

Likewise, after termination of the second copying and before depression of the copy key 22, the ten-key 21 may be depressed to change only the remaining copy number of the first copying. That is, change of the set number of the first copying after termination of the second copying becomes possible without cancelling the recalled reduction flag and size flag.

Incidentally, in a case where the size of the first copying by the recalled size flag differs from that of the second copying given preference, copying is still executed when the copy key 22 is depressed after termination of the second copying. Also, copying is still executed even if, after termination of the second copying, the sheets in the sheet containing portions 10, 10' are replaced with sheets differing in size from the sheets used in the first copying or the cassette 10 is replaced with a cassette different in size. Thus, even if the sheets for the first copying are exhausted by the second copying, copying can be carried out in other size. However, the copying is resumed at the magnification of the first copying and the display of the sheet size of the first copying is effected. This can be seen from the indicator (size lamp) and therefore, before the copy key is depressed, the size key can be redepressed to effect the remaining copying.

In this manner, by the depression of the copy key 22, the first copying is resumed and each time a sheet is fed, the recalled data in the memories M3 and M4 are again incremented and, only when they become coincident with the numbers in the memories M1 and M2, the first copying is terminated.

Next, when the stop key is depressed during the preferential copying, a sequence control similar to that when the stop key has been depressed during the previous copying takes place to interrupt the copying. Also, even before the preferential copying is started, the stop key and interrupt flag are sensed by routine ⑥ and the step jumps to the recall step 17 of routine ④, in which a sequence control similar to that when the preferential copying has been completed takes place.

Even if the interrupt key is depressed before the first copying is started, a routine similar to that when the interrupt key is depressed during execution of the copying is executed to retract the data and, when the stop key has been depressed after the depression of the interrupt key, the data is likewise recalled. Thereafter, the data can be cancelled by the clear key.

Reference is now had to FIGS. 4–4 to describe an example of the copy medium auto reset in which the sheet of the size of the first copying is confirmed and the first copying is resumed. This auto reset step is added to the recall step of FIGS. 4–3B.

Assume that a series of initial copyings are executed by selecting the size B5 contained in the cassette UP and, before the completion thereof, an interrupt instruction is given and a series of preferential copyings are executed by selecting the size A4 contained in the deck LW. After termination of the preferential copying, the memory RAM data is recalled by step 17. Then, whether or not the size flag of B5 has been set is determined in step 18. Since it has been set, the step proceeds to step 19, in which whether or not sheets of size B5 are present in the container portions UP and LW is checked up and, when such sheets are not present in any of the container portions, the no-sheet lamp is turned on to inhibit the resumption of the interrupted copying by the copy button (step 20). When sheets are present, the turn-on of lamp is changed over from A4 lamp to B5 lamp and further, whether or not the sheets are present in the container portions UP and LW is determined in the manner as shown in steps 3-1 to 3-4. When the sheets are present in the container portion UP, the designation signal for LW of the preferential copying is cancelled to render the paper feed roller of the cassette UP operative and thus, sheets are automatically fed from the cassette UP at the timing on the predetermined sequence by the depression of the copy button.

Figures 1D, 4:
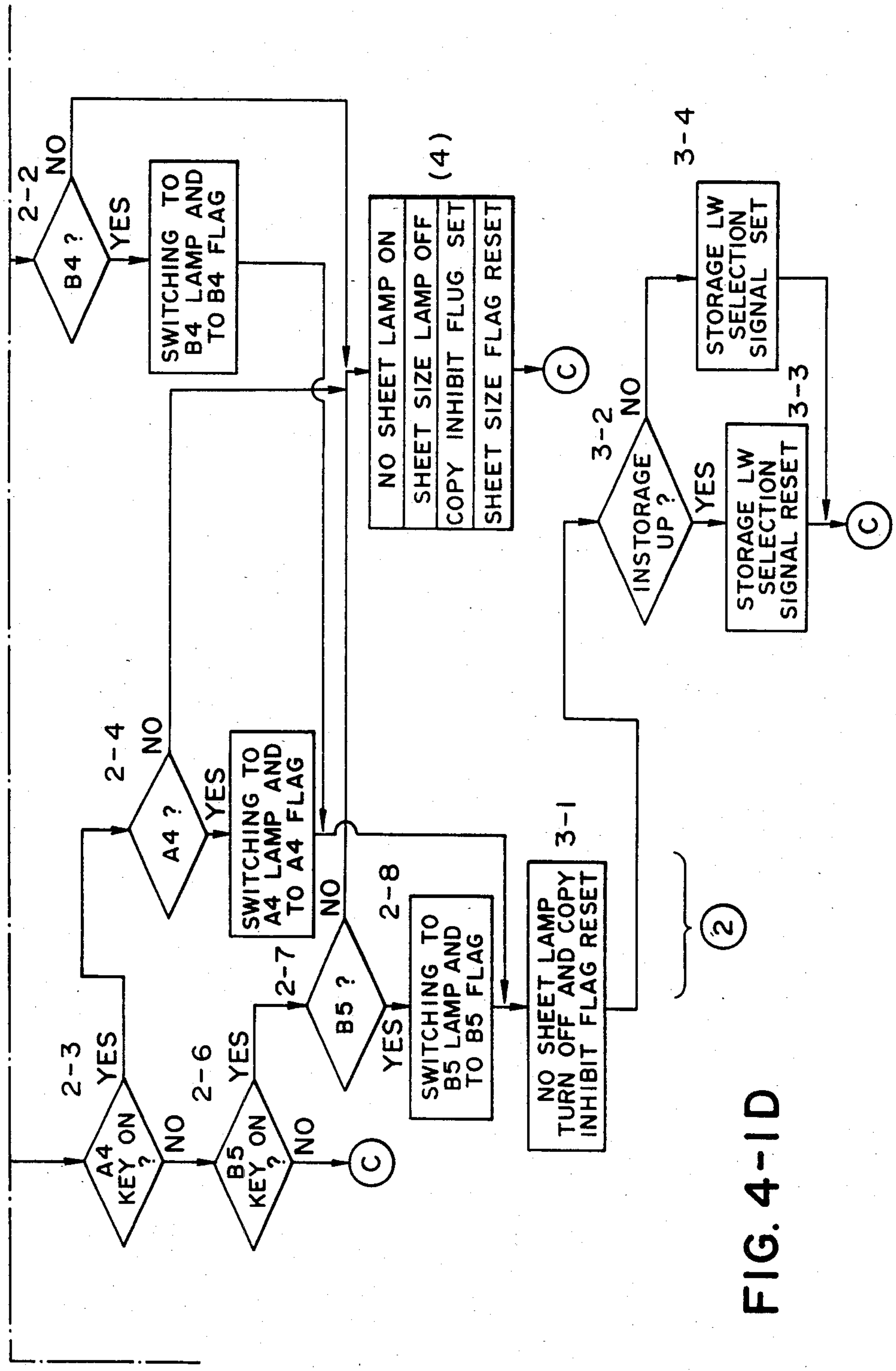
Figures 2A, 4:
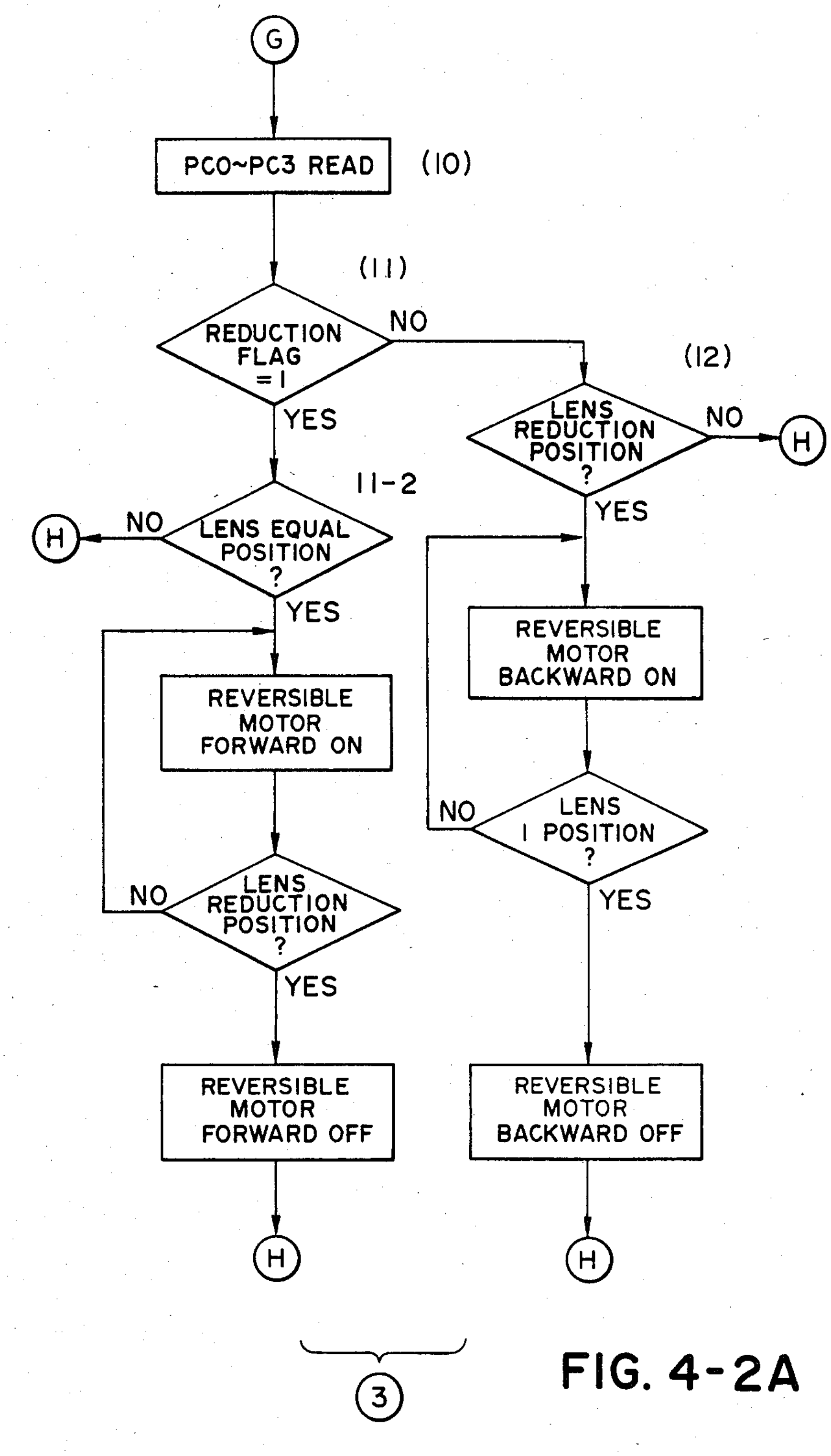
Figures 2B, 4:
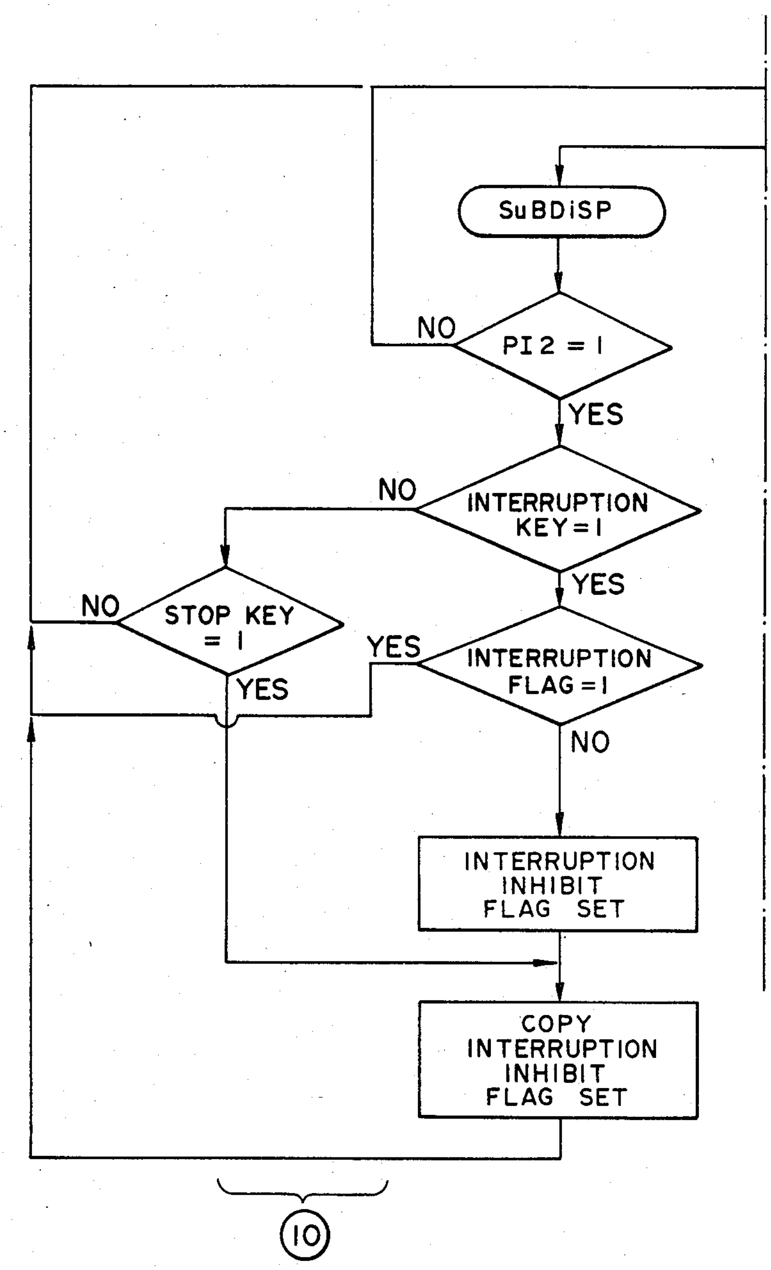
Figures 2C, 4:
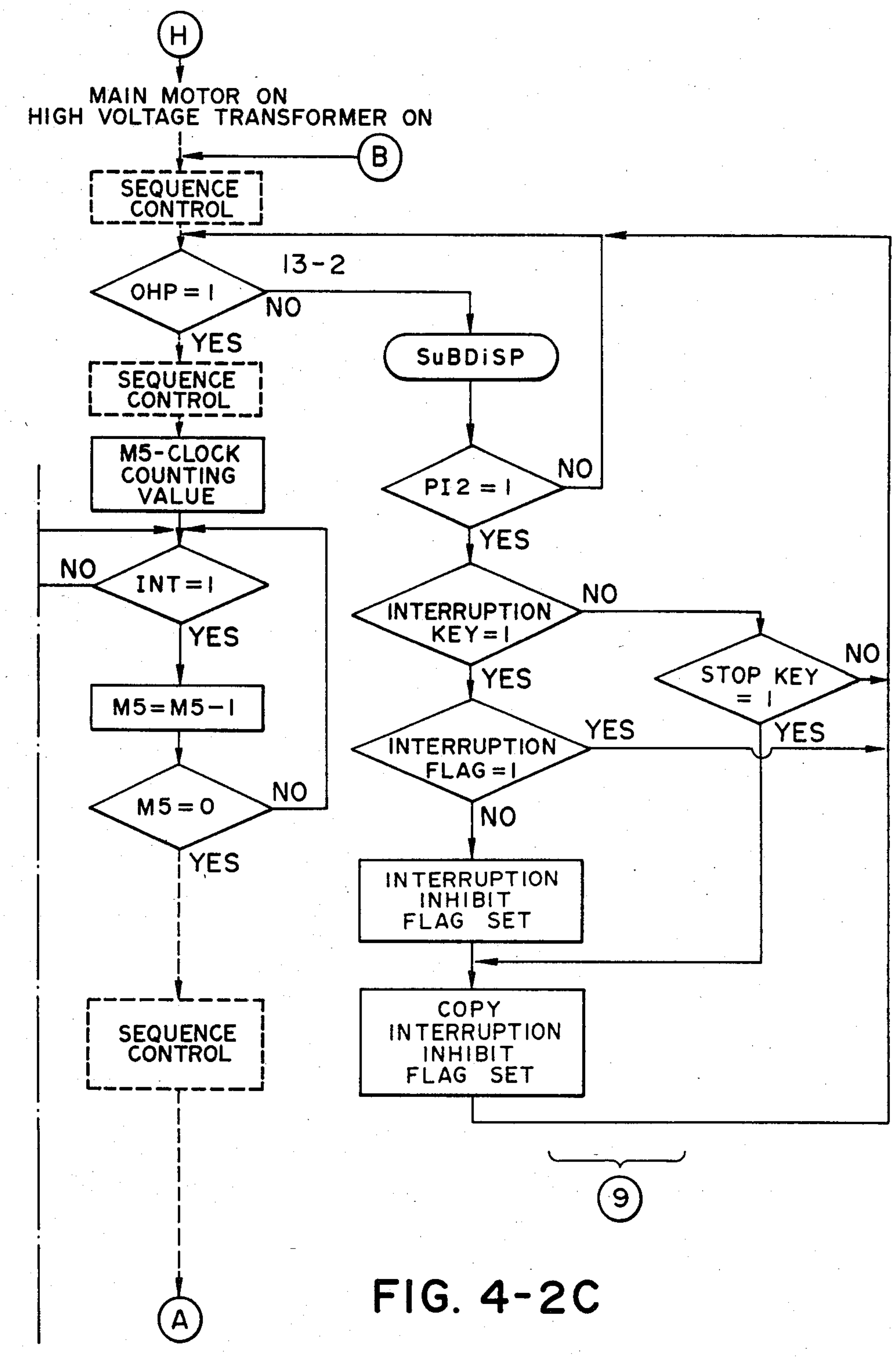
Figures 3A, 4:
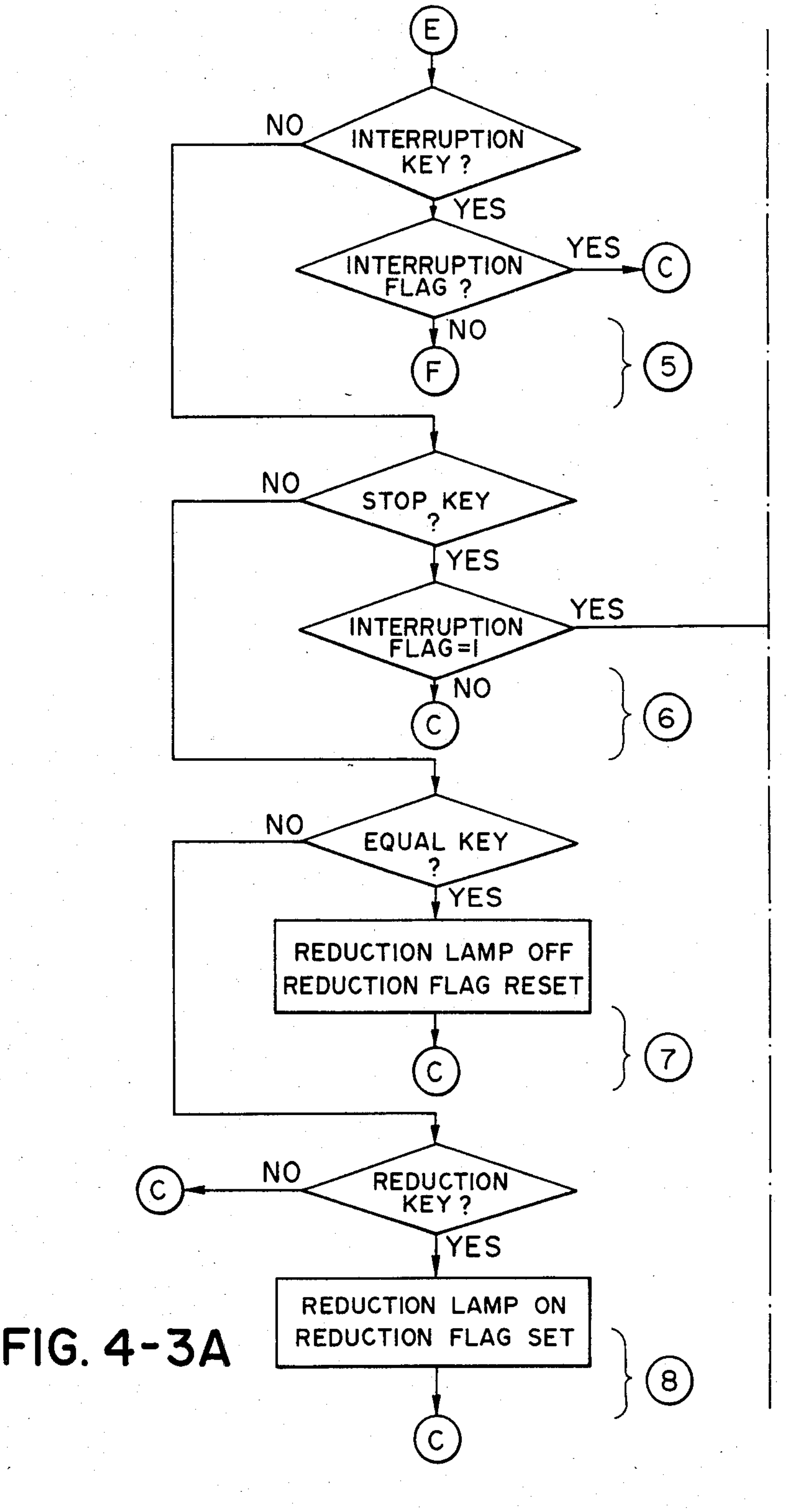
Figures 3B, 4:
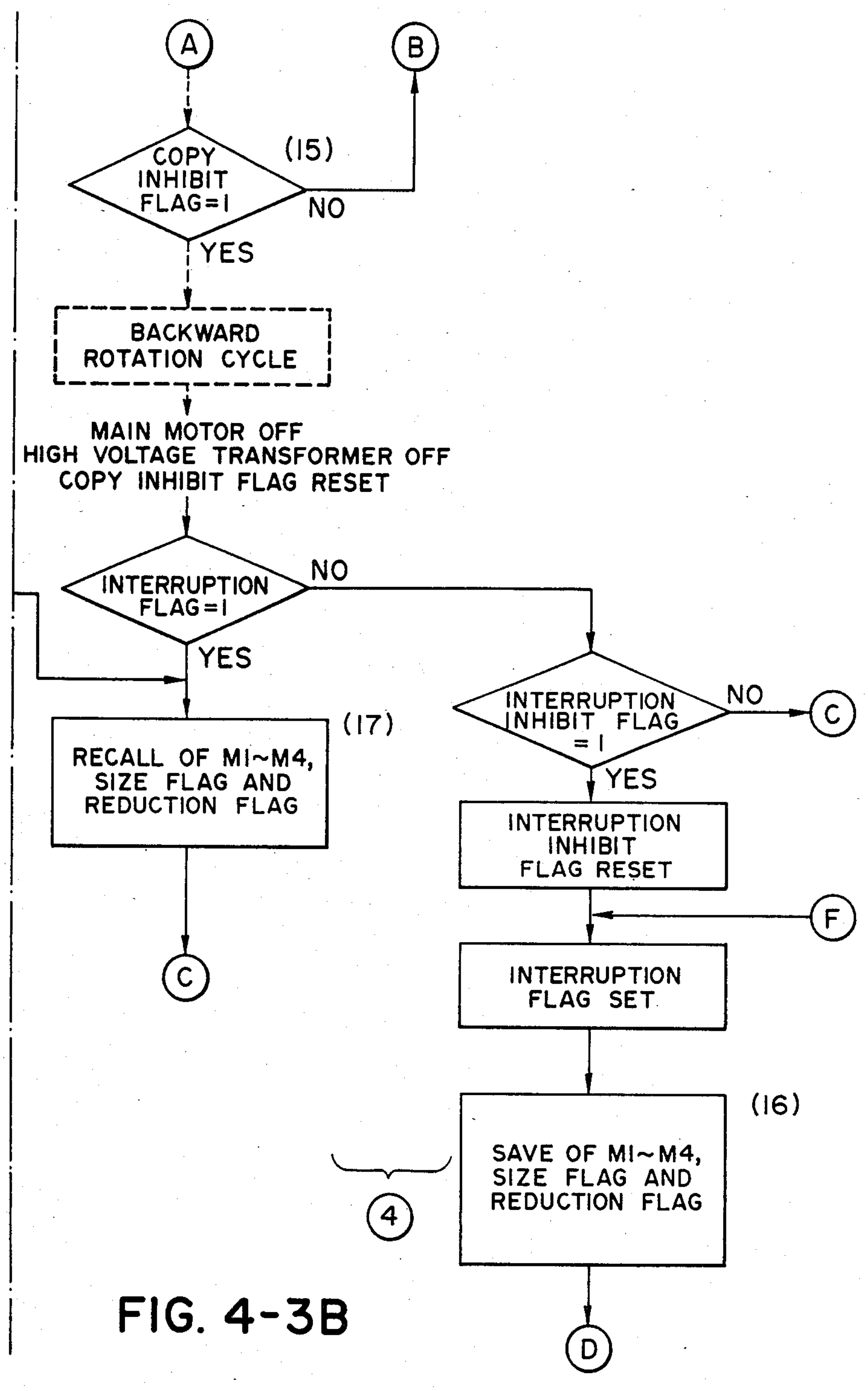

Also, when there is no sheet of size B5 but sheets of size A4 are usable, sheets of size A4 contained in the deck LW may be fed by depressing the A4 key (FIGS. 4-1D, step 2-3). That is, the feeding portion in which sheets of the size for the first copying are present can be automatically selected to complete the first copying and also, change can be readily effected.

Thereafter, where the size of the interrupted copying differs from the size of the preferential copying, step 21 is likewise carried out to automatically reset the feeding portion to the container portion for the interrupted size.

Accordingly, when the interrupted copying is resumed, it can bew completed without depressing the size key, the numeric key and the magnification changing key.

Figures 4, 4A:
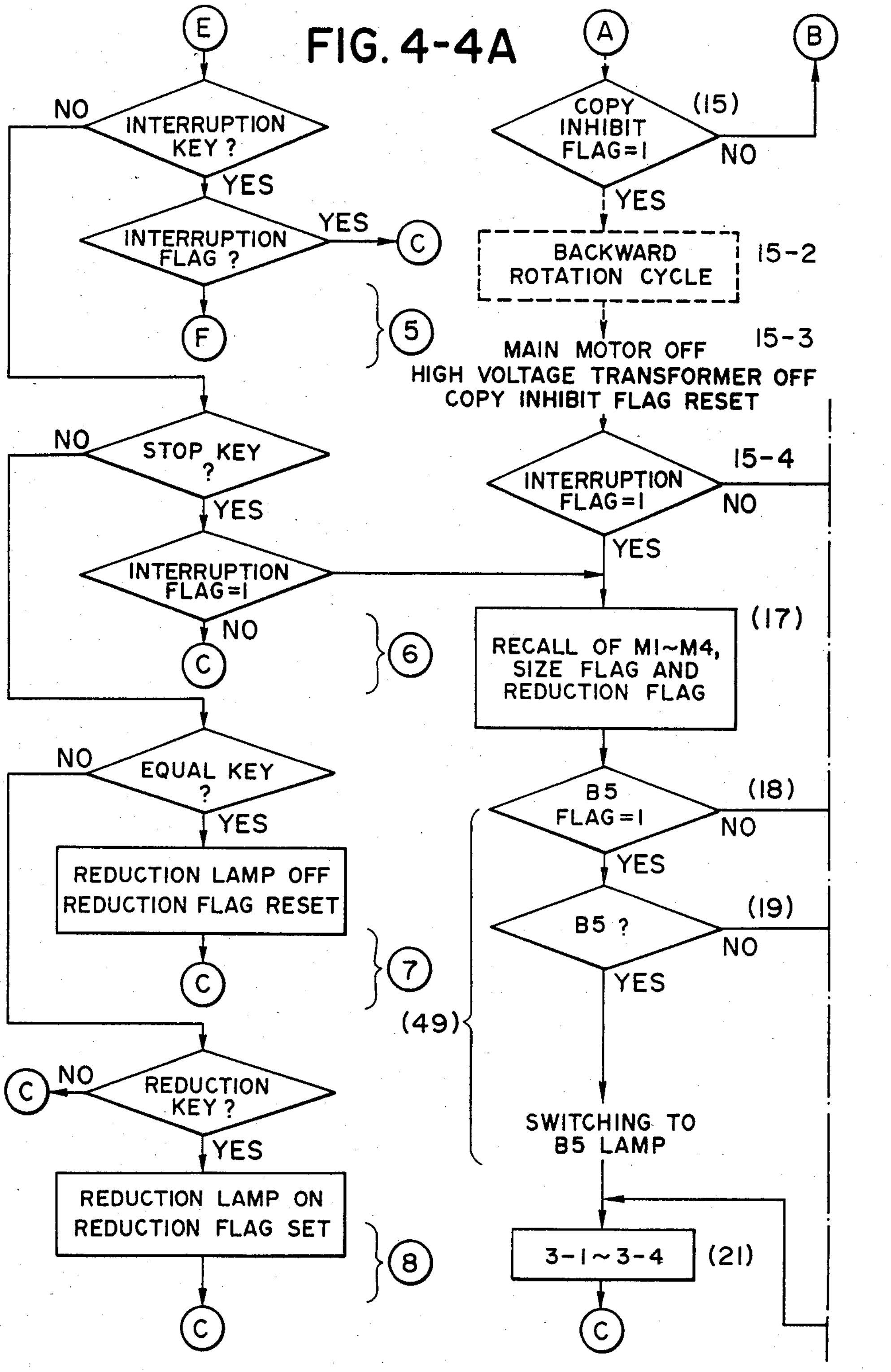
Figures 4, 4B:
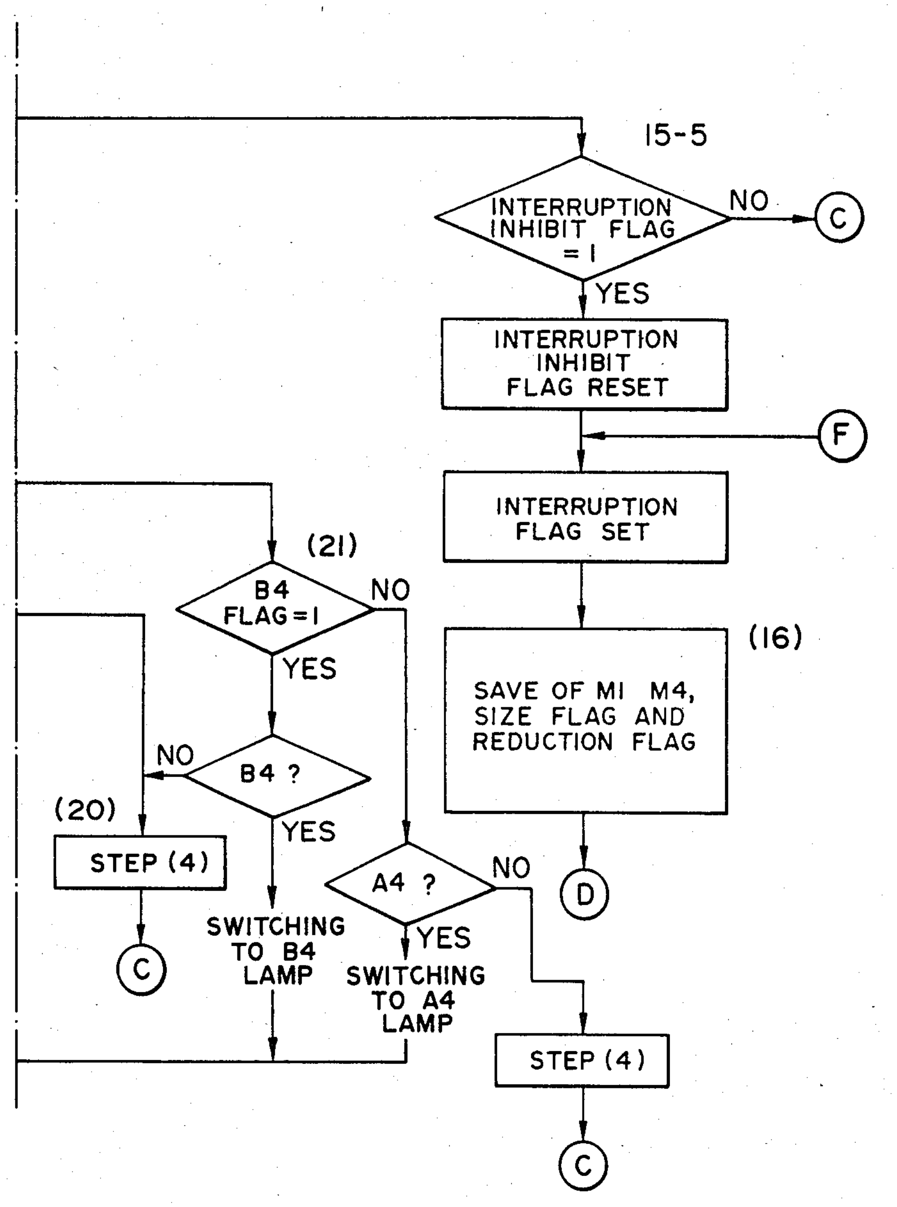
Figures 2, 5:
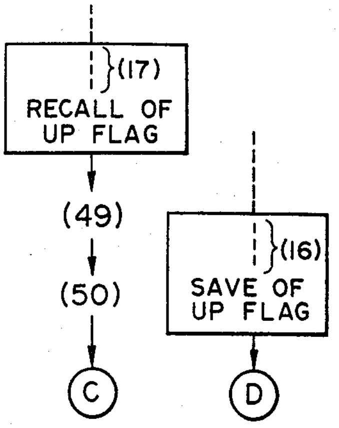
Figures 1, 5:
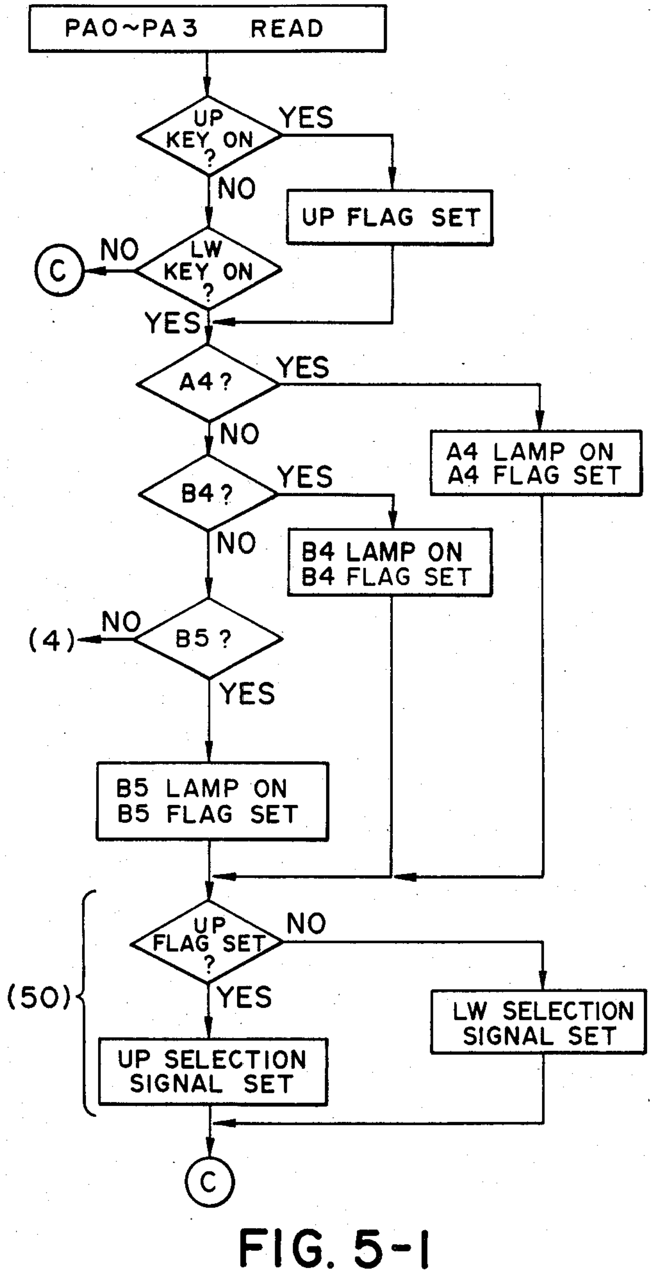

The present embodiment is also applicable to a case where feeding portion designating keys for UP and LW are provided in the operating unit of FIG. 2 so that desired sheets are selected thereby. This is made possible by modifying the steps 2-1 to 3-4 of the key entry routine PAO–PA3 of FIGS. 4-1*a* as shown in FIGS. 5-1 and modifying the save step 16, recall step 17 and subsequent steps of FIGS. 4-4A∼4-4B as shown in FIG. 5-2. That is, in FIGS. 5-1, the signal from a matrix to which the UP key and the LW key are connected is determined by the sensing of ports PA0–PA3. When the UP key is depressed, UP flag is set. When the UP key or the LW key is depressed, the sheet size is determined (the size flag is set) in the manner previously described. Then, the selection signal of the paper feed roller for UP or LW is put out from the output port PD2. Thus, even during the magnification change or during the preferential copying at the changed magnification, copying can be carried out by selecting the cassette. In FIGS. 5-2, during the preferential copying, the UP flag together with the size flag is saved into the memory and, when the preferential copying has been terminated, those flags are recalled. Then, the size of the first copying is confirmed and displayed, and a sheet is fed from the feeding portion for the first copying. When there is no sheet of the size for the first copying, copying is not effected.

When the sheets in the desired container portion have become exhausted during the preferential copying or after termination of the preferential copying, paper feed can also be continuously effected from another container portion which contains sheets of the same size. This may be accomplished by placing the steps 49 and 21 of FIGS. 4-4A∼4-4B after the sequence step 13-1. Alternatively, it may be accomplished by placing the step 21 instead of the step 50 of FIGS. 5-2. In this case, when sheets of the same size are present in the container portion UP and the deck LW, the feeding from the deck LW is given preference.

As described above, hurried magnification change copying can be readily effected and hurried magnification change can also be readily effected and in addition, copying on sheets of various sizes becomes easy.

What we claim is:

1. A copying apparatus comprising:

a plurality of operable means for forming images on copy materials, including optical means provided in the optical path of a document image;

first input means for entering a numerical value to obtain a desired number of copies;

second input means for selecting one of a plurality of copy magnifications;

means for displaying information related to copy operations such as the number of copies and the copy magnifications;

memory means for storing the information related to copy operations; and control means, for operation after a discrimination is made as to whether the stopping of a copy operation is an interruption of a first copy operation, or a stop or completion of a second copy operation executed prior to said first copy operation upon interruption thereof; wherein, in the event that the stopping of the copy operation is discriminated as the interruption of the first copy operation, the information related to said first copy operation, which information has been stored in said memory means, is saved as preparation for executing said second copy operation which has a higher priority, and the information related to said second copy operation is displayed on said display means, while the position of said optical means associated with the magnification is maintained at the position associated with said first copy operation operations, until an input necessary for said second copy operation is entered; and, wherein, in the event that the stopping of the copy operation is discriminated as a stop or completion of the second copy operation, the display content on said display means is switched from the information related to he second copy operation to the information related to the first copy operation which is saved on said memory means.

2. A copying apparatus according to claim 1, further comprising a plurality of container means for storing different copy materials, and third input means for selecting one of the container means of the copy materials, wherein said control means causes the data concerned with the copy material in said first copying operation to be stored in a memory means, and said control means selects one of the container means independently from selecting the magnification by said second input means.

3. A copying apparatus according to claim 2, wherein said third input means provides a size signal related to one of said container means.

4. A copying apparatus according to claim 1, wherein said control means changes the data of the first copying operation by the input operation of said first or second input means after the termination of the second copying operation but before the start of a resuming operation.

5. A copying apparatus comprising:

a plurality of operable means for forming images on copy materials, including optical means provided in the optical path of a document image;

first input means for entering a numerical value to obtain a desired number of copies, second input means for selecting one of a plurality of copy magnifications;

means for displaying data related to copy operations, such as the number of copies and the copy magnifications;

memory means for storing the data related to copy operations;

an interruption key for interrupting a first copy operation; and control means responsive to an input from said interruption key and successive inputs from said first input means and/or said second input means for providing control such that data related to a second copy operation is stored in an area of said memory means, which area is different from one for data related to the first copy operation, the data related to the second copy operation is displayed on said display means, said optical means is controlled, after a start instruction of the second copy operation, based on magnification data of the data related to the second copy operation stored in said memory means, and thereafter said operable means is controlled to perform the second copy operation based on the data related to the second copy operation;

wherein said control means is adapted to provide further control such that after completion of the second copy operation the data related to the first copy operation stored in an area of said memory means, which area is different from one for data related to the second copy operation, is recalled, the display content on said display means is switched from the data related to the second copy operation to the data related to the first copy operation, said optical means is controlled, after start instruction of the first copy operation, based on magnification data of the data related to the first copy operation stored in said memory means, and thereafter said operable means is controlled to perform the first copy operation based on the data related to the first copy operation.

6. A copying apparatus according to claim 5, further comprising a pluraliity of container means for storing different copy materials and third input means for selecting one of the container means of the copy materials, wherein said control means causes the data concerned with the copy material in said first copying operation to be stored in a memory means, and said control means selects one of the container means independently from selecting the magnification by said second input means.

7. A copying apparatus according to claim 5, wherein said control means changes the data of the first copying operation by the input operation of said first or second input means after the termination of the second copying operation but before the start of a resuming operation.

8. A copying apparatus according to claim 5, wherein said control means resumes the first copying operation independently of the size of said copy materials after the termination of said second copying operation, while displaying the size during the resumption.

9. A copying apparatus according to claim 5, further comprising a plurality of container means for storing different size copy materials, wherein said control means blocks a resumption when, after the termination of said second copying operation, there are no materials of the same size as the materials in the container means used in said first copying operation.

10. A copying apparatus according to claim 5, further comprising a plurality of container means for storing different sized copy materials, wherein when, after the termination of said second copying operation, the material in the container means used in said first copying operation differs from that for a resumption, and the same material is present in another container means, said control means causes such material to be fed from said another container means.

11. An apparatus according to claim 1 or 5 wherein said control means controls said display means to switch the displayed number associated with said first copy operations to "1" when an instruction for enabling said second copy operations is made.

12. An apparatus according to claim 1 or 15 wherein said control means controls said optical means to be set to a position for a new copy operation prior to a scanning start, after an image formation start instruction.

13. A copying apparatus comprising:

a plurality of container means for storing different copy materials wherein each said container means has size detecting means;

a plurality of operable image forming means for forming images on copy materials;

first input means for inputting a copy size data;

second input means for inputting a copy magnification data;

identifying means responsive to said first input means and said size detecting means for identifying which container means stores the copy material corresponding to the input copy size data; and control means for controlling said operable means in response to said identifying means to select a container means which stores a suitable sized copy material, to feed the copy material from the selected container means, and to form the image on the copy material with a desired copy magnification, said control means causing display means to provide an indication if there is no container which stores a suitable sized copy material, as the result of the identification by said identifying means of such fact, and said control means being responsive to said first and second input means to select the suitable container independently of the magnification input.

14. A copying apparatus comprising:

a plurality of container means for storing different copy materials;

a plurality of operable means for forming images on copy materials, input means for selecting one of the container means;

means for detecting a lack of copy material in the selected container means and/or a size of copy material in the selected container means;

display means for displaying information from said input means or said detecting means; and control means for controlling said operable means such that during an interruption of first copy operations, second copy operations are executed, and after termination of said second copy operations said first copy operations are resumed, wherein said control means checks, based on the information from said detecting means, the size and/or lack of the copy material in the container means associated with said first copy operations prior to the resumption thereof, and causes said display means to display the checking result, and wherein a resumption of said first copy operations is permitted by said control means regardless of the checking result, upon selection of another container means with which said first copy operation is available.

* * * * *

UNITED STATES PATENT AND TRADEMARK OFFICE

CERTIFICATE OF CORRECTION

PATENT NO. : 4,602,867

DATED : July 29, 1986

INVENTOR(S) : KATSUICHI SHIMIZU, ET AL.

It is certified that error appears in the above-identified patent and that said Letters Patent is hereby corrected as shown below:

COLUMN 4

Line 41, "these" should read --These--.
Line 48, "thorugh" should read --through--.
Line 61, "reductinlamp" should read --reduction lamp--.
Line 62, "outto" should read --out to--.

COLUMN 11

Line 33, "bew" should read --be--.

Signed and Sealed this

Fourteenth Day of April, 1987

*Attest:*

DONALD J. QUIGG

*Attesting Officer* — *Commissioner of Patents and Trademarks*